March 8, 1966 J. J. COSTOLOW 3,239,433
ADDITION OF OXYGEN DURING METHYLVINYLPYRIDINE
DISTILLATION TO PREVENT POLYMERIZATION
Filed May 31, 1962
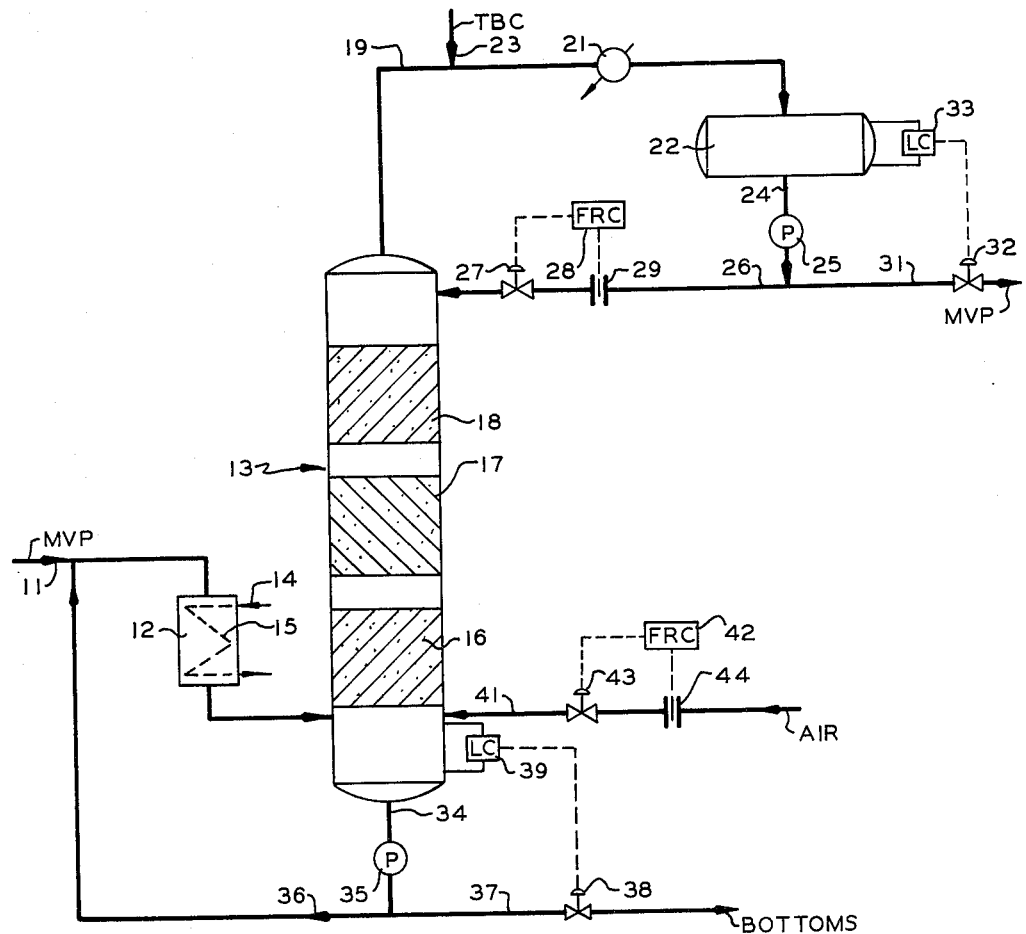
INVENTOR.
J. J. COSTOLOW
BY Young and Quigg
ATTORNEYS United States Patent Office 3,239,433
Patented Mar. 8, 1966

3,239,433
ADDITION OF OXYGEN DURING METHYLVINYL-PYRIDINE DISTILLATION TO PREVENT POLYMERIZATION
John J. Costolow, Pasadena, Tex., assignor to Phillips Petroleum Company, a corporation of Delaware
Filed May 31, 1962, Ser. No. 198,993
15 Claims. (Cl. 203—8)

This invention is directed to an improved process for the fractional separation of a polymerizable organic compound from a mixture containing the same. In one specific aspect, it is directed to the fractional separation of 2-methyl-5-vinyl pyridine (MVP) from a mixture consisting essentially of MVP and soluble MVP polymer.

2-methyl-5-vinyl pyridine (MVP) can be produced on a commercial scale by catalytic dehydrogenation of 2-methyl-5-ethyl pyridine (MEP). In addition to the main product, MVP, a certain amount of pyridine, as such, 2-picoline, 3-picoline, 3-ethyl pyridine, lutidine (2,5-dimethyl pyridine), and 3-vinyl pyridine by-products are produced. The vinylpyridines are useful intermediates in the preparation of fibers, adhesives, ion exchange resins, and synthetic rubber.

In conventional operation the product from the dehydrogenation is fractionally distilled in three steps. In the first step unreacted MEP and lighter components are separated overhead from the MVP and heavies in a steam vacuum fractional distillation column with reflux. The kettle product, containing about 65–70% by weight MVP, is dewatered and subjected to secondary vacuum fractional distillation with the usual heat exchanger and reboiling auxiliaries and a higher vacuum. The kettle product from this step contains about 86–90 weight percent MVP, about 2–6% MEP, and about 2–10 weight percent soluble MVP polymer. The overhead contains about 30 weight percent MVP, and this is recycled to the primary fractional distillation column. The kettle product from the secondary fractional distillation column is used as feedstock for the finishing operation wherein this high purity material is vacuum fractionated to produce 95+ mol percent finished MVP as overhead. Inasmuch as the finishing operation may be considered a flashing, the bottoms product from this operation is termed variously "flash residue" and "kettle product." By "soluble" polymers I mean "MVP soluble." The bottoms (flash residue) from the finishing operation is a mixture of MVP, heavy pyridines, and soluble MVP polymer.

While the two-step vacuum fractionation I have described is one way of concentrating the MVP, it is to be emphasized that this invention is in no way dependent upon this feature; the MVP fraction of the dehydrogenation product may be concentrated in any other suitable manner without departing from the scope of this invention.

It is an object of the present invention to reduce the formation of polymers in the finishing operation. It is another object of this invention to recover a greater percentage of a polymerizable product from a mixture containing the product. Yet another object of the invention is to recover a greater percentage of MVP in a finishing operation.

Other objects, aspects, and advantages of the invention will be apparent from a study of the disclosure, the drawing and the appended claims to the invention.

In accordance with the present invention a method and apparatus are provided for reducing the formation of polymer in a finishing operation by the introduction of an oxygen containing gas, such as air, into the feed stream to the finishing operation as it is introduced into the finishing column. It has been found that such introduction of oxygen is very effective in the reduction of formation of polymer in the finishing operation, and particularly so when utilized in combination with the introduction of an inhibitor, such as a mono- or di-hydroxy substituted aromatic inhibitor, into the overhead product from the finishing column, a portion of which is returned to the finishing column as reflux.

Referring now to the drawing there is shown a diagrammatic illustration of a finishing operation in accordance with the invention. A feed stock comprising MVP and soluble MVP polymer is passed through line 11, and reboiler 12 into packed column 13. Steam is passed through line 14 into coil 15 in reboiler 12. Column 13 is a suitable size such as 3 feet in diameter by 41 feet in height and contains three 10 feet sections 16, 17, and 18 of 2″ ceramic Raschig rings for packing, with a liquid disengagement space in the upper portion of column 13 of a suitable size, such as 4 feet in diameter by 6 feet in length.

The overhead from column 13 is withdrawn through line 19 and passed through condenser 21 into accumulator 22. A suitable inhibitor, such as tert-butylcatechol (TBC), is introduced into overhead product in line 19 by way of line 23. If desired the inhibitor can be introduced directly into column 13, or be added by way of accumulator 22 or reflux line 26. The inhibitor can be added at a rate in the range of about .06 to .1 weight percent based on the overhead product. Condensate is withdrawn from accumulator 22 by way of line 24 and pump 25, and a portion of the withdrawn condensate is passed through line 26 and valve 27 into an upper portion of column 13 as reflux. The rate of flow through line 26 is controlled by valve 27 which is manipulated by flow rate controller 28 responsive to the differential pressure across orifice 29 located in line 26. The remainder of the withdrawn condensate is passed through line 31 and valve 32 at a rate responsive to the liquid level in accumulator 22 as determined by liquid level controller 33.

The kettle product is withdrawn from column 13 by way of line 34 and pump 35, and a portion of the withdrawn kettle product is passed through line 36 into line 11 and then through reboiler 12 into column 13. The remainder of the withdrawn kettle product is passed through line 37 and valve 38 at a rate responsive to the liquid level in column 13 as determined by liquid level controller 39.

In accordance with the invention an oxygen containing gas is introduced through line 41 into column 13 at a point below packing 16 at a suitable rate, such as in the range of 0.2 to 2 standard cubic feet per gallon of the total of feed and reflux as determined by flow rate controller 42 which manipulates valve 43 responsive to the differential pressure across orifice 44 located in line 41.

While the process has been described as utilizing TBC as the inhibitor, other mono- and di-hydroxy substituted aromatic inhibitors which could be utilized include ortho-amino-phenol, various nitro-substituted phenols such as 2,6-dinitro-4-chlorophenol, 2,4-dinitro-6-chlorophenol, 2,6-dinitro-3-chlorophenol, and 2,5-dinitro-4-chlorophenol; 3,4-diaminophenol hydrochloride; aminothiophenol; o-hydroxybenzyl alcohol, alpha anphthol, beta-di-naphthol, p-bromophenol, 5-methyl-1,3-benzenediol, p-phenyl phenol, pentachlorophenol, 2,4,6-tribromophenol, 2,4,6-trichlorophenol, pyrogallol, n-butylpyrogallol, 1,4-dihydroxyanthraquinone, 2,4-dihydroxyacetophenone, resorcinol, phenyl-o-hydroxybenzoic acids, 1,4-dihydroxybenzene, 2-chloro-5-hydroxytoluene, 2-amino-5-hydroxytoluene, 2,4-dinitro-1-naphthol, m-aminophenol, p-aminophenol, 2-amino-5-nitrophenol, dibenzyl-p-aminophenol, o-nitrophenol, dinitroresorcinol, and sodium nitroesorcinol.

The following examples of operation of the system illustrated in the drawing are presented as a further illustration of the invention and are not to be unduly construed to limit the invention.

*Example I*

Two runs were made in the MVP finishing column with a feed having a composition of about 90 weight percent MVP, about 4.5 weight percent MEP and about 3 weight percent soluble polymer with no introduction of air into the column for the first run and introduction of air into the column below the lower packing for the second run with the conditions and results as set forth below in columns I and II, respectively.

|  | I | II |
|---|---|---|
| Bottoms Temperature (° F.) | 195 | 195 |
| Reboiler Outlet Temperature (° F.) | 197 | 197 |
| Overhead Temperature (° F.) | 147 | 145 |
| Overhead Pressure (mm. Hg abs.) | 9.5 | 9.5 |
| Feed input (lbs.) | 1,596 | 1,819 |
| Overhead product (lbs.) | 1,451 | 1,694 |
| Kettle Product (lbs.) | 146 | 130 |
| TBC added (lbs.) | 6 | 6 |
| Air added (c.f.m.) | None | 2 |
| Polymer in Feed (lbs.) | 50 | 61 |
| Polymer from column (lbs.) | 85 | 74 |
| Length of Test (minutes) | 280 | 300 |
| Total Polymer formed in column (lbs.) | 35 | 13 |
| Total Polymer formed in column (lbs./min.) | .125 | .043 |
| Total Polymer formed in column (lbs./lb. of product) | .024 | .008 |

It is readily apparent that the introduction of air into the MVP finishing column at a point below the lowest packing reduced the formation of polymer in the column by 22 pounds even though the second run was for a longer period of time. As shown by the total polymer formed in the column on the basis of either pounds of polymer formed per minute or pounds of polymer formed per pound of product, the addition of air reduced polymer formation in the column by approximately 67%.

*Example II*

Two additional runs were made in the MVP finishing column with a feed having the composition set forth in Example I under the conditions and with the results as set forth in columns I and II, respectively.

|  | I | II |
|---|---|---|
| Feed Rate (g.p.m.) | 1.5 | 1.5 |
| External reflux (g.p.m.) | 1.2 | 1.2 |
| Bottom Temperature (° F.) | 190 | 190 |
| Reboiler Outlet Temperature (° F.) | 220 | 220 |
| Overhead Temperature (° F.) | 145 | 145 |
| TBC added (lbs./hr.) | .25 | .25 |
| Air added (c.f.m.) | None | 2 |
| Total Polymer formed in column (lbs./min.) | .12 | .05 |
| Total Polymer formed in column (lbs./lb. of product) | .012 | .005 |

It is readily apparent that the introduction of air, here at the rate of .74 standard cubic feet per gallon of feed and reflux, reduced the formation of polymer in the column by over 58%.

Reasonable variation and modification are possible within the scope of the disclosure, the drawing, and the appended claims to the invention.

I claim:

1. In a process for recovery of methylvinylpyridine from a mixture containing methylvinylpyridine and soluble methylvinylpyridine polymer wherein said mixture is subjected to distillation to produce a methylvinylpyridine overhead product and a kettle product containing soluble methylvinylpyridine polymer, and wherein a portion of the methylvinylpyridine subjected to distillation is converted to additional methylvinylpyridine polymer, the improvement of reducing the formation of additional polymer in the step of distillation comprising adding an oxygen containing gas to said mixture at the commencement of said step of distillation.

2. A process in accordance with claim 1 wherein said oxygen containing gas is air.

3. A process in accordance with claim 2 wherein said distillation step is refluxed with condensed overhead MVP and air is added to said mixture at the commencement of said step of distillation at a rate in the range of about 0.2 to about 2 standard cubic feet per gallon of feed and reflux to said step of distillation.

4. A process in accordance with claim 3 wherein air is added at a rate of about .74 standard cubic feet per gallon of feed and reflux.

5. A process in accordance with claim 1 further comprising adding a compound selected from the group consisting of tertiary butyl catechol, 2,6-dinitro-4-chlorophenol, 2,4-dinitro-6-chlorophenol, 2,6-dinitro-3-chlorophenol, and 2,5-dinitro-4-chlorophenol to the overhead product and recycling a portion of the thus treated overhead product to said step of distillation as reflux.

6. A process in accordance with claim 5 wherein said inhibitor is tert-butylcatechol.

7. A process in accordance with claim 6 wherein said oxygen containing gas is air.

8. A process in accordance with claim 1 wherein said distillation step is carried out in a packed distillation column and the step of adding an oxygen containing gas is carried out by introducing air into said packed distillation column at a point below the lowest packing therein.

9. A process for purifying a methylvinylpyridine-containing stream comprising distilling said stream in the presence of a polymerization-inhibiting amount of an oxygen-containing gas and recovering the methylvinylpyridine free of polymerized methylvinylpyridine present in the feed stream.

10. The process of claim 9 further comprising distilling said stream in the presence of tertiary butyl catechol.

11. The process of claim 9 wherein said oxygen-containing gas is air.

12. A method for inhibiting the polymerization of methylvinylpyridine when subjected to conditions which cause flashing of said pyridine comprising adding a polymerization-inhibiting amount of an oxygen-containing gas thereto.

13. The method of claim 12 further comprising adding a polymerization-inhibiting amount of tertiary butyl catechol thereto.

14. The process of claim 9 wherein said polymerization inhibiting amount is in the range of 0.2 to 2 standard cubic feet per gallon of material being distilled.

15. The process of claim 12 wherein said polymerization inhibiting amount is in the range of 0.2 to 2 standard cubic feet per gallon of material being subjected to said flashing conditions.

References Cited by the Examiner

UNITED STATES PATENTS

| 2,399,340 | 4/1946 | Franz. |
| 2,698,848 | 1/1955 | Mahan. |
| 2,757,130 | 7/1956 | Burns. |
| 2,826,581 | 3/1958 | Mahan et al. |
| 2,922,754 | 1/1960 | Ray _____ 202—53 |
| 2,938,033 | 5/1960 | Stehman. |

ROBERT F. BURNETT, *Primary Examiner.*

GEORGE D. MITCHELL, NORMAN YUDKOFF,
*Examiners.*